United States Patent [19]

Matsuda et al.

[11] 4,231,083
[45] Oct. 28, 1980

[54] POWER CONVERSION APPARATUS

[75] Inventors: Yasuo Matsuda; Kazuo Honda; Nobuyoshi Muto, all of Hitachi, Japan

[73] Assignee: Hitachi, Ltd., Japan

[21] Appl. No.: 931,008

[22] Filed: Aug. 4, 1978

[51] Int. Cl.² .................. H02M 7/155; H02H 7/122
[52] U.S. Cl. ..................... 363/135; 363/57; 363/96; 307/252 C; 307/252 M
[58] Field of Search ................. 363/27–28, 363/57–58, 68, 96, 135–139; 307/252 C, 252 M

[56] References Cited

U.S. PATENT DOCUMENTS

| | | | |
|---|---|---|---|
| 3,355,654 | 11/1967 | Risberg | 363/129 X |
| 3,465,233 | 9/1969 | Johnston et al. | 363/136 X |
| 3,928,775 | 12/1975 | Steigerwald | 307/252 C |
| 3,940,633 | 2/1976 | Steigerwald | 307/252 C |
| 3,955,131 | 5/1976 | Piccone et al. | 363/68 |
| 4,028,610 | 6/1977 | Cord'Homme | 363/57 |
| 4,107,551 | 8/1978 | Akamatsu | 307/252 MX |

OTHER PUBLICATIONS

"Application Techniques for High Power Gate Turn-Off Thyristors" by R. L. Steigerwald, IAS'75 Annual pp. 165–174.

Primary Examiner—J. D. Miller
Assistant Examiner—Peter S. Wong
Attorney, Agent, or Firm—Craig & Antonelli

[57] ABSTRACT

When a power conversion apparatus such as inverter or chopper comprises gate turn-off thyristors (GTO's), current limiting reactors are connected to cathodes of the GTO's and opposite ends of each of the reactors are connected to positive and negative terminals, respectively, of a gate power supply which supplies a turn-on current and a turn-off current to the respective GTO. With this arrangement, an energy stored in each of the reactors at the turn-off of the GTO is absorbed by the gate power supply.

12 Claims, 6 Drawing Figures

POWER CONVERSION APPARATUS

The present invention relates to a power conversion apparatus including gate turn-off thyristors (GTO's), and more particularly to a power conversion apparatus which is adapted to enhance an operation efficiency thereof.

As is well known, the GTO is extinguished by a reverse bias current which flows from a cathode to a gate at the time of extinction. This distinguishes it from a conventional thyristor which is extinguished by a reverse voltage applied between an anode and a cathode. When such a GTO is incorporated in a circuit, if a voltage rise rate dv/dt at the time of turn-off of the GTO is too high, the GTO is broken. In order to prevent such breakdown, a means is provided to suppress the voltage rise rate dv/dt. This means is commonly referred to as a snubber circuit, which comprises a parallel circuit of a diode D and a resistor R, which parallel circuit is connected in series with a capacitor C. The snubber circuit is connected in parallel with the GTO. With this arrangement, when the GTO turns off, a load current $I_o$ diverts to the capacitor C through the diode D so that the voltage rise rate dv/dt of the voltage between the anode and the cathode of the GTO is suppressed to a predetermined rate.

In the power conversion apparatus such as inverter or chopper which includes the GTO with such snubber circuit as a switching element, a reactor L is connected in series with the GTO. The reactor L functions to suppress a current rise rate di/dt at the time of turn-on of the GTO or to suppress the current rise rate di/dt in case of an arm short trouble of the GTO.

At the time of the turn-off of the GTO, an energy equal to $\frac{1}{2}LI_o^2$ is stored in the reactor L, a problem resides in the handling of this energy because, unlike the conventional thyristor, the GTO having a self-extinguishing ability does not include a forced commutation circuit so that the handling of the energy has to exclusively rely on the capacitor C of the snubber circuit. In order to absorb the energy by the capacitor C only, the capacitance of the capacitor has to be increased. However, since the while energy stored in the capacitor C is consumed by the resistor R of the snubber circuit, the energy loss increases when the capacitance of the capacitor C is increased. In other words, the efficiency of the power conversion apparatus is lowered. On the other hand, if the capacitance of the capacitor C is not increased in order to prevent reduction of the efficiency, the capacitor C will be over-charged so that the voltage across the capacitor C exceeds an allowable breakdown voltage of the GTO and the GTO will be broken. A theoretical analysis on the energy is discussed by R. L. Steigerwald in his article entitled "Application Techniques for High Power Gate Turn-off Thyristors", IAS '75 ANNUAL pp. 165–174. The article further shows to short the reactor L with a diode D2 and a resistor R2 for handling the energy. With this arrangement, the over-charge voltage at the time of the turn-off of the GTO does not exceed the allowable voltage even when the capacitance of the capacitor C is small. Thus, the breakdown of the GTO can be prevented. However, even with this arrangement, the energy is still consumed by the resistor R2 and the problem of loss remains unresolved.

It is an object of the present invention to provide a power conversion apparatus which includes a means for causing an energy stored in a reactor connected in series with a GTO to be positively absorbed by a gate power supply for the GTO. With this arrangement, the GTO will not be broken even if a capacitance of a capacitor of a snubber circuit is small, because the energy is absorbed by the gate power supply for the GTO. Furthermore, according to the present invention, there is little loss of energy because the energy is positively absorbed by the gate power supply for the GTO rather than it is consumed by a resistor like in a conventional method. In other words, there no longer occurs a problem of reduction of efficiency of the power conversion apparatus.

It is another object of the present invention to provide a power conversion apparatus in which a reactor connected in series with a GTO is divided into two sections, with an energy stored in one of the sections being positively absorbed by a gate power supply for the GTO and an energy stored in the other reactor section being absorbed by a main power supply through a load.

This arrangement is effective particularly when the energy stored in the reactor is too large to be absorbed by the gate power supply only.

A feature in the construction of the present invention resides in that one of the reactors included in the power conversion apparatus which feeds the energy back to the gate power supply is necessarily connected to the cathode of the GTO. With this arrangement, the potential at the cathode terminal is equal to the potential at the negative terminal of the gate power supply. In this manner, the energy stored in the reactor is successfully absorbed by the gate power supply for the GTO.

In the accompanying drawings.

Figure 1:
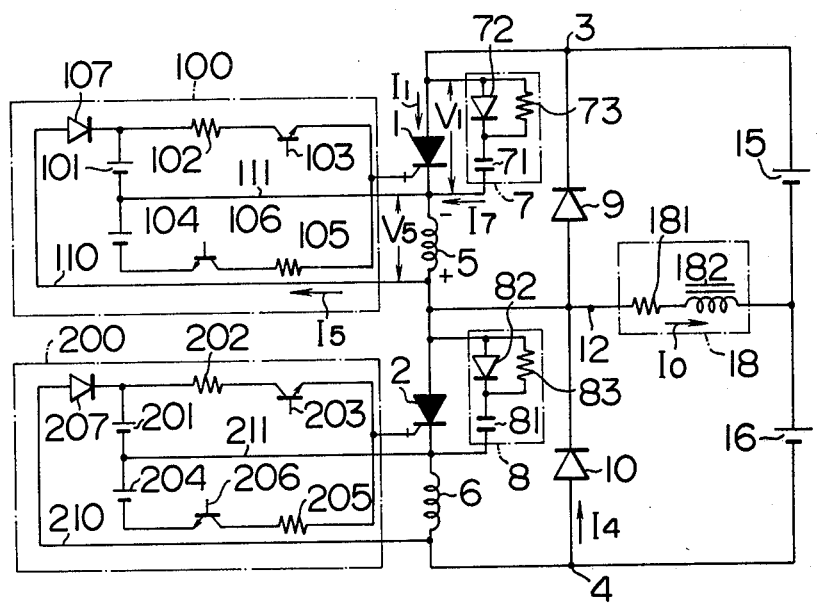
FIG. 1 shows an embodiment of the present invention incorporated in an inverter.

Referring to FIG. 1, there is shown an embodiment of the present invention incorporated in an inverter. As shown, GTO 1 and GTO 2 are connected across D.C. input terminals 3 and 4. Reactors 5 and 6 are connected to cathodes of the GTO's 1 and 2, respectively. Stating more exactly, an anode of the GTO 1 is connected to the D.C. input terminal 3 (positive terminal), the reactor 5 is connected between the cathode of the GTO 1 and an anode of the GTO 2, and the reactor 6 is connected between the cathode of the GTO 2 and the D.C. input terminal 4 (negative terminal). Snubber circuits 7 and 8 are connected in parallel with the GTO's 1 and 2, respectively. The snubber circuit 7 comprises a series connection of a capacitor 71 and a parallel circuit of a diode 72 and a resistor 73. Similarly, the snubber circuit 8 comprises a series connection of a capacitor 81 and a parallel circuit of a diode 82 and a resistor 83.

Connected in parallel with the series connection of the GTO 1 and the reactor 5 is a diode 9, and connected in parallel with the series connection of the GTO 2 and the reactor 6 is a diode 10. Alternatively, the diode 9 may be connected in parallel with the GTO 1 and the diode 10 may be connected in parallel with the GTO 2 to attain a similar effect. An output terminal 12 is connected to the junction node of the reactor 5 and the GTO 2.

On the other hand, the D.C. input terminals 3 and 4 are connected to D.C. power supplies 15 and 16, respectively. The D.C. input terminal 3 is connected to a positive terminal of the D.C. power supply 15, a negative terminal of the D.C. power supply 15 is connected to a positive terminal of the D.C. power supply 16, and a negative terminal of the D.C. power supply 16 is connected to the D.C. input terminal 4. Connected between the junction node of the D.C. Power supplies 15 and 16 and the output terminal 12 is a load 18 which includes a load resistor 181 and a load reactor 182.

Numerals 100 and 200 denote gate circuits for the GTO's 1 and 2, respectively. The GTO 1 is turned on and off by the gate circuit 100 in the following manner. When the GTO 1 is to be turned on, a transistor 103 is first rendered conductive. Then, a current from a GTO turn-on gate power supply 101 flows through a path 101-102 (resistor)-103-1-101 to turn on the GTO 1. When the GTO 1 is to be turned off, the transistor 103 is rendered non-conductive and a transistor 106 is rendered conductive. Then, a current from a GTO turn-off gate power supply 104 flows through a path 104-1-105 (resistor)-106-104 to turn off the GTO 1. Thereafter, the transistor 106 is rendered non-conductive. In exactly the same way, the GTO 2 is turned on and off by the gate circuit 200. In the gate circuit 200, numeral 201 denotes a GTO turn-on gate power supply, 204 denotes a GTO turn-off gate power supply 202 and 205 denote resistors, and 203 and 206 denote transistors.

Figure 2:
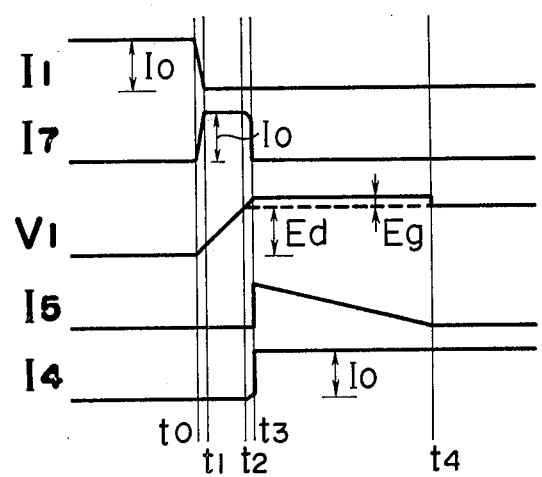
FIG. 2 illustrates the operation of a GTO 1 shown in FIG. 1, at the time of turn-off.

Features of the embodiment shown in FiG. 1 reside in that a positive terminal of the turn-on gate power supply 101 for the GTO 1 is connected to the junction node of the reactor 5 and the GTO 2 via a connection line 110 and a negative terminal of the turn-on gate power supply 101 is connected to the junction node of the reactor 5 and the GTO 1 via a connection line 111, and that a positive terminal of the turn-on gate power supply for the GTO 2 is connected to the junction node of the reactor 6 and the D.C. input terminal 4 via a connection line 210 and a negative terminal of the turn-on gate power supply 201 is connected to the junction node of the reactor 6 and the GTO 2 via a connection line 211. Diodes 107 and 207 are inserted in the connection lines 110 and 210, respectively, in order to prevent the back flow of the currents from the gate power supplies 101 and 201, respectively. Referring now to FIG. 2, the operation of the inverter shown in FIG. 1 is explained.

Figure 3:
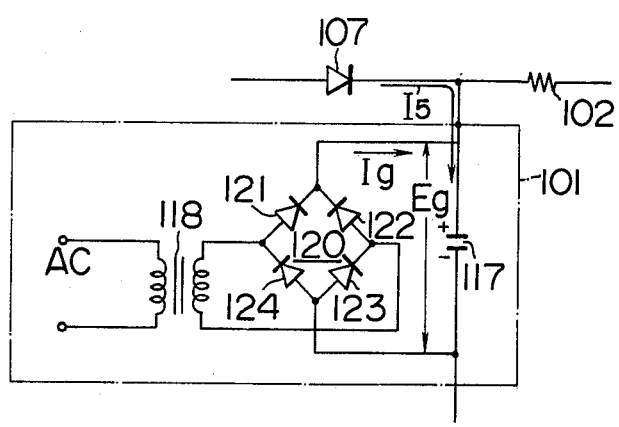
FIG. 3 shows a detail of a gate power supply for GTO shown in FIG. 1.

FIG. 2 illustrates the operation when the GTO 1 is in FIG. 1 is turned off. It is assumed that the GTO 1 in the inverter is conducting and the GTO 2 is non-conducting. Under this condition, a load current $I_o$ from the D.C. power supply 15 flows through a path 15-3-1-5-12-18-15 in FIG. 1. It is now assumed that the GOT 1 is to be turned off under this condition. The transistor 106 in the gate circuit 100 is rendered conductive at a time $t_o$ shown in FIG. 2. Then, the current from the turn-off gate power supply 104 flows through the path 104-1-105-106-104 in FIG. 1 to start to turn off the GTO 1. Accordingly, the load current $I_o$ is gradually diverted to a path 15-3-7-5-12-18-15. At a time $t_1$, the turn-off of the GTO 1 is completed. In FIG. 2, $I_1$ denotes a current flowing in the GTO 1, and $I_7$ denotes a current flowing in the snubber circuit 7. During the period $t_o$-$t_1$ from the start of turn-off of the GTO 1 to the completion thereof, the currents $I_1$ and $I_7$ coexist. At and after the time $t_1$, the current $I_1$ is zero and the current $I_7$ is equal to the load current $I_o$. A voltage $V_1$ across the GTO 1 gradually rises from the start of turn-off or the time $t_o$, and at the time $t_2$ it is equal to the sum of the voltages of the D.C. power supplies 15 and 16, because the capacitor 71 of the snubber circuit is charged up by the load current $I_o$. From the time $t_2$, the diode 10 conducts and the load current $I_o$ is gradually diverted to a path 16-4-10-12-18-16. $I_4$ denotes a current flowing through the diode 10 under this condition. Consequently, from the time t2, the current flowing in the reactor 5 gradually changes so that a voltage $V_5$ is developed across the reactor 5 in the illustrated polarity. When the voltage $V_5$ reaches the voltage $E_g$ of the gate power supply 101, a current $I_5$ from the reactor 5 starts to flow through a path 5-110-107-101-5. Accordingly, the voltage $V_5$ across the reactor 5 does not exceeds $E_g$. Consequently, the voltage $V_1$ across the GTO 1 is bound to the sum of the D.C. power supply voltage $E_d$ and the gate power supply voltage $E_g$. This time point is shown by $t_3$. From the time $t_3$, the current $I_7$ is zero and the current $I_4$ is equal to the load current $I_o$. The current $I_5$ continues to flow until a time $t_4$ at which the whole energy stored in the reactor 5 has been absorbed by the gate power supply. From the time $t_4$, the voltage $V_1$ across the GTO 1 returns to the sum voltage $E_d$ of the D.C. power supplies 15 and 16. Referring now to FIG. 3, the manner in which the energy stored in the reactor 5 is absorbed by the gate power supply 101 is explained.

FIG. 3 shows a detail of the gate power supply 101 shown in FIG. 1. Normally, a capacitor 117 is charged to the predetermined voltage $E_g$ by the D.C. current $I_g$ supplied from a rectifier bridge 120, which comprises four diodes 121, 122, 123 and 124 and converts an A.C. voltage supplied via a transformer 118 to a D.C. voltage. When the voltage $V_5$ across the reactor 5 shown in FIG. 1 reaches the gate power supply voltage $E_g$, the current $I_5$ flows into the gate power supply 101 from the reactor 5 through the diode 107, as described above. The energy stored in the reactor 5 is expressed by $\frac{1}{2}L_oI_o^2$ where $L_o$ is an inductance of the reactor 5, and as a result of the flow of the current $I_5$, an energy equal to $\frac{1}{2}C_o(\Delta V_o)^2$ is shifted to the capacitor 117, where $C_o$ is a capacitance of the capacitor 117 and $\Delta V_o$ is a voltage increment across the capacitor 117 by the current $I_5$ when the charge by the current $I_g$ is neglected.

The turn-on characteristic of the GTO is worse than that of the conventional thyristor in order to assure a better turn-off characteristic. This means that the GTO requires a larger gate power than the conventional thyristor at the time of turn-on. Accordingly, it highly contributes to the enhancement of the efficiency of the inverter to shift the energy stored in the reactor 5 to the turn-on gate power supply 101. If the energy required for turning off the GTO is larger than the energy required for turning on the GTO, it is advisable to shift the energy stored in the reactor 5 to the turn-off gate power supply 104.

Now, the extent of the effect of the inverter of 20 KVA rated capacity which incorporated the present embodiment will be discussed. Assumption is made here that the inverter output frequency $f_o$ is 1 KHz, the load current $I_o$ is 130 A, the inductance $L_o$ of the reactor connected to the cathode of the GTO is $15 \times 10^{-6}$H. Then, the power $P_o$ stored in the reactor is expressed by;

$$P_o = \tfrac{1}{2}L_o I_o^2 F_o = 126.75 \ W$$

In accordance with the present embodiment, the power $P_o$ is absorbed by the gate power supply. In a 3-phase 6-arm inverter incorporating the present embodiment, there are six combinations of the GTO and the reactor. Therefore, the total power stored in the inverter is equal to $6P_o = 760.5$ W. If an output W of the inverter is 18.7 KW, a ratio of the total power to the inverter output is given by;

$$6P_o/W \times 100 \approx 4.06\%$$

Accordingly, in accordance with the present embodiment, the reduction of efficiency equal to approximately 4.06%, which has been observed in the prior art, can be prevented. In addition, the capacity of the gate power supply can be reduced by the amount corresponding to the amount of energy recovered from the reactor.

Figure 4:
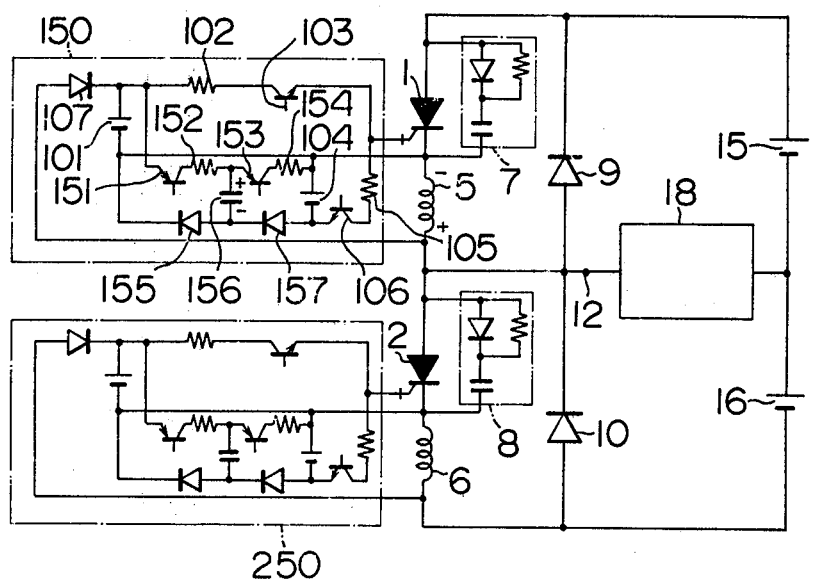
FIG. 4 shows a modified embodiment of the inventer shown in FIG. 1.

FIG. 4 shows a modification of the inverter shown in FIG. 1, in which the gate circuit for the GTO has been modified. The present embodiment is effective particularly when the frequency of the inverter is very high. In the turn-on gate power supply 101 shown in FIG. 1, when the inverter frequency exceeds a predetermined upper limit, a power absorbed from the reactor 5 is larger than an output power required for turning on the GTO 1. That is, the gate power supply 101 produces an excessive energy. As a result, the voltage of the gate power supply 101 rises. In order to prevent such voltage rise, it is a conventional method to insert a dummy resistor in the connection line 110 in FIG. 1. In the present embodiment, on the other hand, the excessive energy produced by the gate power supply 101 is used to charge the means for supplying the turn-off current to the GTO.

In this manner, the voltage rise of the gate power supply 101 is prevented. The present embodiment is now explained in more detail in conjunction with FIG. 4. Since the main circuit of the inverter is exactly identical to that in FIG. 1, the following description refers only to the gate circuit 150 (or 250) for the GTO.

In the gate circuit 150 shown in FIG. 4, when the GTO 1 is turned off, the energy stored in the reactor 5 at the time of the turn-off is shifted in the turn-on gate power supply 101. When the GTO 1 is to be next turned on, the transistors 103 and 151 are simultaneously rendered conductive. Then, the current from the turn-on gate power supply 101 flows through a path 101-102-103-1-101 in FIG. 4 to turn-on the GTO 1 and also flows through a path 101-151-152 (resistor)-156(capacitor)-155(diode)-101 in FIG. 4 to charge the capacitor 156 in the illustrated polarity. On the other hand, when the GTO 1 is to be turned off, the transistors 103 and 105 are rendered non-conductive and the transistors 106 and 153 are simultaneously rendered conductive. Then, the current from the turn-off gate power supply 104 flows through a path 104-1-105-106-104 in FIG. 4 to turn-off the GTO and the discharging current from the capacitor flows through a path 156-153-154(resistor)-104-157(diode)-156 to supplementarily charge the turn-off gate power supply 104. Since an energy is again stored in the reactor 5, the GTO 1 thereafter repeats the turn-off operation described above. The gate circuit 250 is similar to the gate circuit 150 in its construction and operation, and hence it is not explained here.

Figure 5:
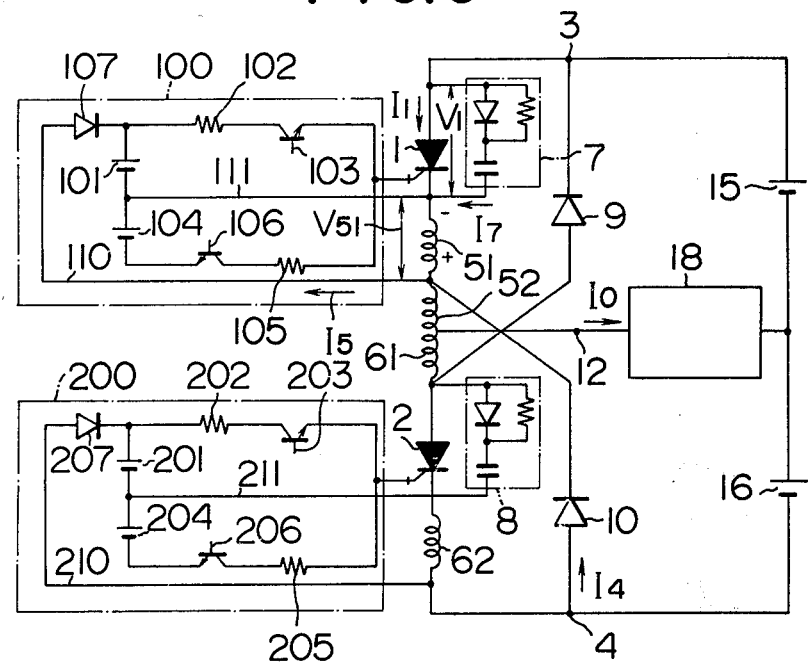
FIG. 5 shows another embodiment of the present invention incorporated in an inverter.

FIG. 5 shows another embodiment of the present invention incorporated in the inverter. Like the embodiment shown in FIG. 4, the present embodiment is effective particularly when the inverter frequency is very high. In the present embodiment, the reactor which is connected in series with each GTO is divided into two portions with an energy stored in one reactor portion being positively absorbed by the gate power supply for the GTO while an energy stored in the other reactor portion being recovered to the main power supply through the load. Accordingly, even where the inverter frequency is high, an excessive energy is not produced in the gate power supply for the GTO even if the gate power supply is of small capacity.

In the present embodiment, the GTO's 1 and 2 and reactors 51, 52, 61 and 62 are connected in series between the D.C. input terminals 3 and 4, as shown in FIG. 5. More particulalry, the anode of the GTO 1 is connected to the D.C. input terminal 3, the series connection of the reactors 51, 52 and 61 is connected between the cathode of the GTO 1 and the anode of the GTO 2, and the reactor 62 is connected between the cathode of the GTO 2 and the D.C. input terminal 4. The snubber circuits 7 and 8 are connected in parallel with the GTO's 1 and 2, respectively. The diodes 9 and 10 are connected in parallel with the series connections of the GTO 1 and the reactors 51, 52 and 61, and the GTO 2 and the reactors 52, 61 and 62, respectively. The output terminal 12 is connected to the junction node of the reactors 52 and 61. The connection of the D.C. power supplies 15 and 16 and the load 18 and the connection of the gate circuits 100 and 200 for the GTO's 1 and 2, respectively and the connection lines 110, 111, 210 and 211 are identical to those in FIG. 1 and hence they are not explained here. The operation of the inverter shown in FIG. 5 is now explained with reference to FIG. 2 again.

Assuming that the GTO 1 is conducting and the GTO 2 is non-conducting, the load current $I_o$ from the D.C. power supply 15 is flowing through a path 15-3-1-51-52-12-18-15 in FIG. 5. When the GTO 1 is to be turned off under this condition, the transistor 106 in the gate circuit 100 is rendered conductive at the time $t_o$ shown in FIG. 2. Then, the current from the turn-off gate power supply 104 flows through a path 104-1-105-106-104 so that the GTO 1 starts to be turned off. As a result, the load current $I_o$ is gradually diverted to a path 15-3-7-51-52-12-18-15. The GTO 1 completes the turn-off operation at the time $t_1$ shown in FIG. 2. During the period $t_o-t_1$ from the start of the turn-off of the GTO 1 to the completion thereof, the currents $I_1$ and $I_7$ coexist. From the time $t_1$, the current $I_1$ is zero and the current $I_7$ is equal to the load current $I_o$. The voltage $V_1$ across the GTO 1 gradually rises from tthe start of the turn-off or the time $t_o$, and at the time $t_2$ it is equal to the sum voltage $E_d$ of the voltages of the D.C. power supplies 15 and 16, because the capacitor in the snubber circuit is charged by the load current $I_o$. From the time $t_2$, the diode 10 conducts so that the load current $I_o$ gradually diverts to a path 16-4-10-52-12-18-16. $I_4$ denotes a current flowing through the diode 10 under this condition. Accordingly, from the time $t_2$, the current flowing through the reactor 51 gradually changes and a voltage $V_{51}$ is developed in the illustrated polarity. When the voltage $V_{51}$ reaches the voltage $E_g$ of the gate power supply 101, the current $I_5$ from the reactor 51 starts to flow through a path 51-110-107-101-51. Accordingly, the voltage $V_{51}$ across the reactor 51 does not exceed the gate power supply voltage $E_g$. As a result, the voltage $V_1$ across the GTO 1 is bound to the sum voltage of the D.C. power supply $E_d$ and the gate power supply voltage $E_g$. This time point is shown by $t_3$. From the time $t_3$, the current $I_7$ is zero and the current $I_4$ is equal to the load current $I_o$. The current $I_5$ continues to flow until the time $t_4$ at which the energy stored in the reactor has been fully discharged. From the time $t_4$, the voltage $V_1$ across the GTO 1 restores to the sum voltage $E_d$ of the voltages of the D.C. power supplies 15 and 16.

According to the present embodiment, since the energies stored in the reactors 51 and 52 are absorbed by the gate power supply 101 and the D.C. power supply 16, respectively, the adverse affect by the excessive energy in the gate power supply need not be taken care of.

In FIG. 5, the gate circuits 100 and 200 for the GTO's may be replaced by the gate circuits 150 and 250 shown in FIG. 4.

Figure 6:
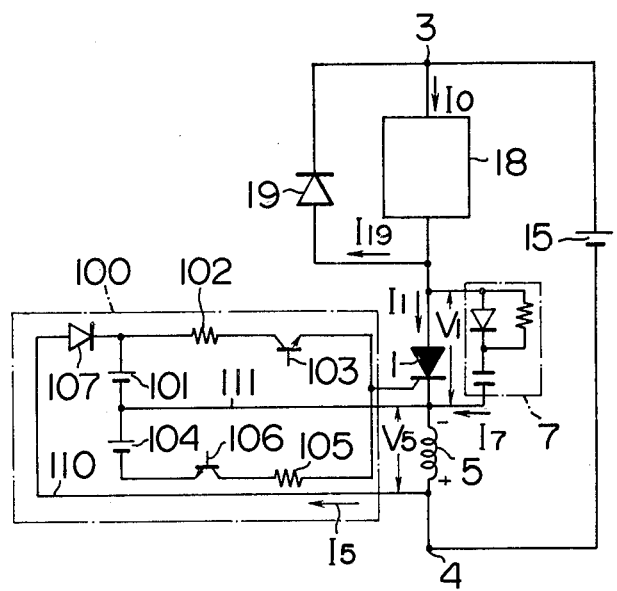
FIG. 6 shows an embodiment of the present invention incorporated in a chopper.

FIG. 6 shows an embodiment of the present invention applied to a chopper circuit. As shown in FIG. 6, one end of the load 18 is connected to the D.C. input terminal 3, the GTO 1 is connected between the other end of the load 18 and one end of the reactor 5, and the other end of the reactor 5 is connected to the D.C. input terminal 4. The snubber circuit 7 is connected in parallel with the GTO 1 and the diode 19 is connected in parallel with the load 18. On the other hand, the D.C. power supply 15 is connected between the D.C. input terminals 3 and 4. The gate circuit 100 for the GTO 1 is of similar construction to that shown in FIG. 1 and hence the explanation thereof is omitted. It should be noted in the present embodiment that, like in the previous embodiment, the reactor 5 is connected to the cathode of the GTO 1, the positive terminal of the gate power supply 101 is connected to the junction node of the reactor 5 and the D.C. input terminal 4 through the connection line 110, and the negative terminal of the gate power supply 101 is connected to the junction node of the reactor 5 and the GTO 1 through the connection line 111. Referring again to FIG. 2, the operation of the chopper circuit of FIG. 6 is now explained.

Let assume that the GTO 1 in the chopper circuit is conducting. Under this condition, the load current $I_o$ from the D.C. power supply 15 flows through a path 15-3-18-1-5-4-15 in FIG. 6. When the GTO 1 is to be turned off under this condition, the transistor 106 in the gate circuit 100 is rendered conductive at the time $t_o$ shown in FIG. 2. Then, the current from the turn-off gate power supply 104 flows through a path 104-1-105-106-104 in FIG. 6 to start to turn-off the GTO 1. Accordingly, the load current $I_o$ is gradually diverted to a path 15-3-18-7-5-4-15. At the time $t_1$, the turn-off of the GTO 1 is completed. During the period $t_o$-$t_1$ from the start of the turn-off of the GTO 1 to the completion thereof, the currents $I_1$ and $I_7$ coexist. From the time $t_1$, the current $I_1$ is zero and the current $I_2$ is equal to the load current. The voltage $V_1$ across the GTO 1 gradually rises from the start of the turn-off or the time $t_o$, and at the time $t_2$ it is equal to the voltage $E_d$ of the D.C. power supply 15. Thereafter, the current flowing through the reactor 5 gradually changes and the voltage $V_5$ is developed across the reactor 5 in the illustrated polarity. When the voltage $V_5$ reaches the voltage $E_g$ of the gate power supply 101, the current $I_3$ from the reactor 5 starts to flow through a path 5-110-107-101-5. Accordingly, the voltage $V_5$ across the reactor 5 does not exceed the voltage $E_g$. As a result, the voltage $V_1$ across the GTO 1 is bound to the sum voltage of the D.C. power supply voltage $E_d$ and the gate power supply voltage $E_g$. This time point is shown by $t_3$. From the time $t_3$, the current $I_7$ is zero and the current $I_{19}$ starts from the initial current $I_o$ and flows through a path 18-19-3-18. This current $I_3$ is supplied by the energy stored in the load 18 during the conduction of the load current $I_o$. The current $I_3$ continues to flow until the time $t_4$ at which the whole energy stored in the reactor 5 has been absorbed by the gate power supply. From the time $t_4$, the voltage $V_1$ across the GTO 1 restores to the voltage $E_d$ of the D.C. power supply 15. In this manner, the energy stored in the reactor is effectively absorbed by the gate power supply.

In FIG. 6, the gate circuit 100 for the GTO may be replaced by the gate circuits 150 and 250 shown in FIG. 4.

We claim:

1. A power conversion apparatus for converting a D.C. input to an A.C. output, comprising:
   first and second input terminals;
   first and second gate turn-off thyristors (GTO's) and first and second reactors connected between said first and second input terminals;
   an anode of said first GTO being connected to said first input terminal, said first reactor being connected between a cathode of said first GTO and an anode of said second GTO, and said second reactor being connected between a cathode of said second GTO and said second input terminal;
   first and second gate circuits for supplying turn-on currents and turn-off currents to said first and second GTO's, respectively;
   a first diode connected in parallel with a first circuit including said first GTO;
   a second diode connected in parallel with a second circuit including said second GTO;
   an output terminal connected to the junction node of said first reactor and said second GTO;
   a first connection line for connecting a positive terminal of a first gate power supply included in said first gate circuit to the junction node of said first reactor and said second GTO, through a third diode;
   a second connection line for connecting a negative terminal of said first gate power supply to the junction node of said first reactor and said first GTO;
   a third connection line for connecting a positive terminal of a second gate power supply included in said second gate circuit to the junction node of said second reactor and said second input terminal, through a fourth diode; and
   a fourth connection line for connecting a negative terminal of said second gate power supply to the junction node of said second reactor and said second GTO.

2. A power conversion apparatus for converting a D.C. input to an A.C. output power, comprising;
   first and second input terminals;
   first and second GTO's and first, second, third and fourth reactors connected between said first and second input terminals;
   an anode of said first GTO being connected to said first input terminal, said first, second and third reactors being connected in series between a cathode of said first GTO and an anode of said second GTO, and said fourth reactor being connected between a cathode of said second GTO and said second input terminal;

first and second gate circuits for supplying turn-on currents and turn-off currents to said first and second GTO's, respectively;

a first diode connected in parallel with the series connection of said first GTO and said first, second and third reactors;

a second diode connected in parallel with the series connection of said second GTO and said second, third and fourth reactors;

an output terminal connected to the junction node of said second and third reactors;

a first connection line for connecting a positive terminal of a first gate power supply included in said first gate circuit to the junction node of said first reactor and said second GTO, through a third diode;

a second connection line for connecting a negative terminal of said first gate power supply to the junction node of said first reactor and said first GTO;

a third connection line for connecting a positive terminal of a second gate power supply included in said second gate circuit to the junction node of said second reactor and said second input terminal, through a fourth diode; and a fourth connection line for connecting a negative terminal of said second gate power supply to the junction node of said second reactor and said second GTO.

3. A power conversion apparatus according to claim 1 or 2, wherein said first and second gate power supplies supply the turn-on currents to said first and second GTO's, respectively.

4. A power conversion apparatus according to claim 3, wherein said first and second gate power supply charge means for supplying the turn-off currents to said first and second GTO's, respectively.

5. A power conversion apparatus according to claim 4 wherein said first and second gate power supplies each comprises an A.C. power supply, a rectifier connected to said A.C. power supply and a capacitor connected to an output terminal of said rectifier.

6. A power conversion apparatus according to claim 3, wherein said first and second gate power supplies each comprises an A.C. power supply, a rectifier connected to said A.C. power supply and a capacitor connected to an output terminal of said rectifier.

7. A power conversion apparatus for converting a D.C. input to a variable D.C. output, comprising;

first and second input terminals;

a load circuit, a GTO and a reactor connected between said first and second input terminals;

one end of said load being connected to said first input terminal, said GTO being connected between the other end of said load and one end of said reactor and the other end of said reactor being connected to said second input terminal;

a gate circuit for supplying a turn-on current and a turn-off current to said GTO;

a first connection line for connecting a positive terminal of a gate power supply included in said gate circuit to the junction node of said reactor and said second input terminal; and a second connection line for connecting a negative terminal of said gate power supply to the junction node of said reactor and said GTO.

8. A power conversion apparatus according to claim 7 wherein said gate power supply supplies said turn-on current to said GTO.

9. A power conversion apparatus according to claim 8 wherein said gate power supply charges means for supplying said turn-off current to said GTO.

10. A power conversion apparatus according to claim 7, 8 or 9 wherein said gate power supply comprises an A.C. power supply, a rectifier connected to said A.C. power supply and a capacitor connected to an output terminal of a rectifier.

11. A power conversion apparatus according to claim 1, wherein said first circuit includes said first reactor connected in series with said first GTO, said first diode being connected in parallel with the series connection of said first GTO and said second circuit includes said first reactor, said second reactor connected in series with said second GTO, and said second diode being connected in parallel with the series connection of said second GTO and said second reactor.

12. A power conversion apparatus according to claim 1 or 2, wherein said first and second gate power supplies each comprise an A.C. power supply, a rectifier connected to said A.C. power supply and a capacitor connected to an output terminal of said rectifier.

* * * * *

UNITED STATES PATENT AND TRADEMARK OFFICE
CERTIFICATE OF CORRECTION

PATENT NO. : 4,231,083  
DATED : October 28, 1980  
INVENTOR(S) : Yasuo MATSUDA et al Page 1 of 2

It is certified that error appears in the above—identified patent and that said Letters Patent is hereby corrected as shown below:

Title Page

Left hand column, insert

[30] Foreign Application Priority Data

| August 10, 1977 | Japan | 52-95136 |
| November 4, 1977 | Japan | 52-131577 |

IN THE DRAWINGS:

Sheet 2: Fig. 3, the connection dot at the junction of the block 101 and the line extending from the junction of the diode 107 and resistor 102 to the + terminal of capacitor 117 should be deleted; and A connection dot should be shown at the connection point of the line extending from the junction of the diode 107 and resistor 102 to the + terminal of capacitor 117 and the line extending from the rectifier bridge 120.

Sheet 3: Fig. 5, a connection dot should be shown at the connection point of reactor 52 and line 12; and a connection dot should be shown at the connection point of the line extending between GTO 2 and reactor 62 and line 211.

UNITED STATES PATENT AND TRADEMARK OFFICE
CERTIFICATE OF CORRECTION

PATENT NO. : 4,231,083
DATED : October 28, 1980
INVENTOR(S) : Yasuo MATSUDA et al It is certified that error appears in the above—identified patent and that said Letters Patent is hereby corrected as shown below:

Column 3, line 34, delete "FIG" and insert --FIG--

IN THE CLAIMS:

Claim 2, column 9; line 15, delete "GTO" and insert --reactor--;
line 22, delete "second reactor" and insert --fourth reactor--;
line 26, delete "second reactor" and insert --fourth reactor--.

Signed and Sealed this

Seventeenth Day of November 1981

[SEAL]

Attest:

GERALD J. MOSSINGHOFF

Attesting Officer

Commissioner of Patents and Trademarks